(12) United States Patent
Kesterson et al.

(10) Patent No.: US 7,460,663 B1
(45) Date of Patent: Dec. 2, 2008

(54) SYSTEM AND METHOD FOR DISTRIBUTING NETWORK COMMUNICATION SIGNALS

(75) Inventors: Don F Kesterson, Parker, TX (US);
Quentin A Owen, Carrollton, TX (US);
Glenn L Gordon, Plano, TX (US);
Robert L Noble, III, Plano, TX (US)

(73) Assignee: Uniden America Corporation, Fort Worth, TX (US)

( * ) Notice: Subject to any disclaimer, the term of this patent is extended or adjusted under 35 U.S.C. 154(b) by 1704 days.

(21) Appl. No.: 09/764,625

(22) Filed: Jan. 17, 2001

(51) Int. Cl.
*H04M 9/00* (2006.01)
(52) U.S. Cl. ............................................... 379/413.03
(58) Field of Classification Search ............ 379/399.01, 379/413.03, 93.09
See application file for complete search history.

(56) References Cited

U.S. PATENT DOCUMENTS

| | | | | |
|---|---|---|---|---|
| 5,014,299 A * | 5/1991 | Klupt et al. | ............... | 379/93.09 |
| 5,802,471 A * | 9/1998 | Sawai et al. | ................. | 455/445 |
| 5,822,406 A * | 10/1998 | Brown | ..................... | 379/88.07 |
| 5,923,663 A * | 7/1999 | Bontemps et al. | ........... | 370/445 |
| 5,930,340 A * | 7/1999 | Bell | ........................ | 379/93.08 |
| 6,175,865 B1 * | 1/2001 | Dove et al. | .................. | 709/220 |
| 6,222,910 B1 * | 4/2001 | Price et al. | ............... | 379/93.37 |
| 6,363,079 B1 * | 3/2002 | Barzegar et al. | ............ | 370/465 |
| 6,400,711 B1 * | 6/2002 | Pounds et al. | ............... | 370/353 |
| 6,728,534 B1 * | 4/2004 | Izumi et al. | ............. | 455/426.1 |
| 6,868,117 B1 * | 3/2005 | Mardinian | .................. | 375/222 |
| 2002/0018521 A1 * | 2/2002 | Sherlock | ..................... | 375/222 |
| 2003/0147513 A1 * | 8/2003 | Goodman | ............... | 379/90.01 |

\* cited by examiner

*Primary Examiner*—Ramnandan Singh
(74) *Attorney, Agent, or Firm*—Baker Botts L.L.P.

(57) ABSTRACT

A communication coupling includes a communication port, which communicates with a network component. The communication port includes first and second paths of communication with the network component. A switch may be coupled with the communication port. The switch includes a first position in which the communication port receives a first communication signal from the network component using the first path of communication and transmits a second communication signal to the network component using the second path of communication. The switch may also include a second position in which the first communication port receives the first communication signal from the network component using the second communication path and transmits the second communication signal to the network component using the first communication path.

21 Claims, 4 Drawing Sheets

SYSTEM AND METHOD FOR DISTRIBUTING NETWORK COMMUNICATION SIGNALS

TECHNICAL FIELD OF THE INVENTION

The present invention relates generally to network communication couplings and more particularly, to a system and method for distributing network communication signals.

BACKGROUND OF THE INVENTION

Products, services and content available from Internet service providers (ISPs) and application service providers (ASPs) have increased substantially, encouraging residential customers, businesses and organizations to upgrade their existing communication systems to handle high-speed transmission of data. Digital subscriber lines (DSLs), for example, offer data transfer rates of approximately eight million bits per second, downstream, and somewhat fewer bits per second upstream, to the service provider.

DSLs frequently use existing copper wires from the telephone company's distribution system to the subscriber's premises, for the communication of high-speed digital signals. Equipment and components are added to the customer's premises to allow for this upgrade of service. To some extent, DSL installation allows for the reuse of existing equipment and components for the receipt and distribution of signals throughout the premises.

SUMMARY OF THE INVENTION

The present invention provides a system and method for distributing network communication signals that substantially eliminate or reduce the problems and disadvantages with the previous methods and systems. A user-friendly communication coupling is provided which consolidates a plurality of connections between a communication system and a high-speed network connection, and allows the communication system to control and distribute signals throughout an existing internal network without substantial modifications.

In accordance with a particular embodiment of the present invention, a communication coupling is provided having a communication port with first and second paths of communication with a network component. A switch may be coupled with the first communication port. The switch includes a first position in which the communication port receives a first communication signal from the network component using the first path of communication and transmits a second communication signal to the network component using the second path of communication. The switch may also include a second position in which the communication port receives the first communication signal from the network component using the second communication path and transmits the second communication signal to the network component using the first communication path.

In accordance with another aspect of the present invention, the communication coupling includes a second communication port, which communicates with the communication system. The second communication port may also transmit the second communication signal to the first communication port.

In accordance with yet another aspect of the present invention, the communication coupling may include a third communication port. The third communication port transmits the first communication signal to the communication system.

In accordance with still another embodiment of the present invention, the second communication signal includes first and second frequency bands. A filter may be provided which separates the first frequency band from the second frequency band.

Technical advantages of certain embodiments of the present invention include a communication coupling having a communication port operable to receive a signal using a first path of communication, and transmit a signal using a second path of communication. Accordingly, interference between the first communication signal and the second communication signal is avoided.

Another technical advantage of certain embodiments include a switch which allows a user to select which path of communication is used to receive the first communication signal, and which path of communication is used to transmit the second communication signal. Therefore, a user may alter the distribution of signals by actuating a switch, eliminating errors in the reconfiguration of wiring and components.

Still another technical advantage of certain embodiments includes a communication coupling which allows a communication system to control the distribution of signals throughout an internal network. Accordingly, services and functionality of the communication system may be made available to existing internal network wiring and components, including derived voice services and high-speed data connections.

Other technical advantages of the present invention will be readily available to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
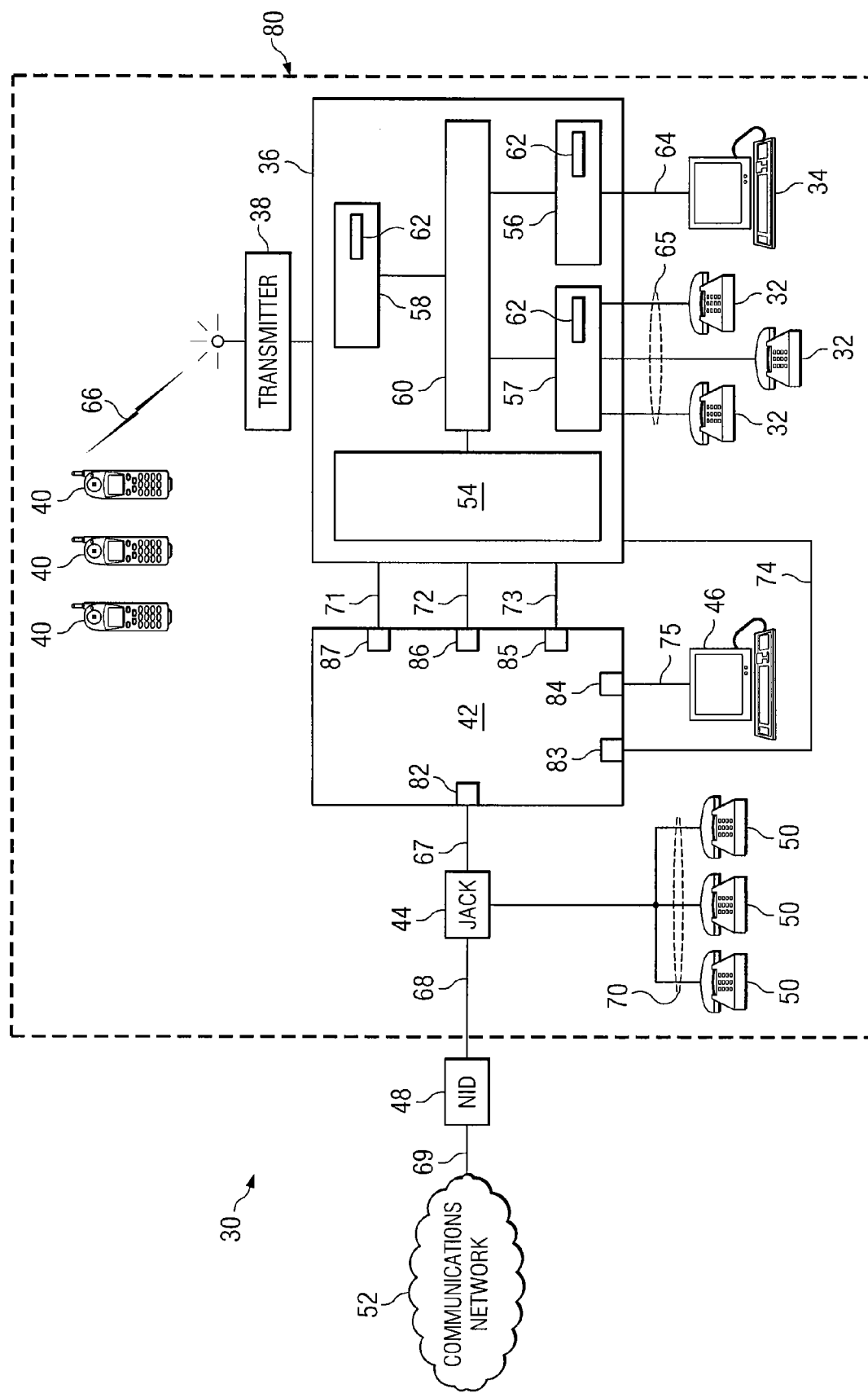
FIG. 1 is a block diagram illustrating a communication coupling incorporating aspects of the present invention, which couples a communication system with a communication network.

FIG. 1 illustrates a communication network 30 that includes a plurality of terminal units 32 and 34, coupled with a communication system 36. A transmitter 38 wirelessly couples terminal units 40 with communication system 36. A communication coupling 42 is also provided, which couples communication system 36 with a modular jack 44. One or more terminal units 46 may also be coupled with communication coupling 42. Modular jack 44 is coupled with a network interface device (NID) 48. Terminal units 50 are coupled with modular jack 44. NID 48 couples modular jack 44 with a communication network 52. Accordingly, voice, video data, control and/or other communication signals (hereinafter, collectively "data") are distributed between communications network 52 and communication system 36. Communication coupling 42 provides a user friendly coupling with enhanced functionality, which may be used in lieu of several connectors, interfaces and filters to couple communication system 36 with communication network 52 and/or other network components.

Signals received by communication system 36 from communication network 52 are processed at a central processor 54, and distributed to one or more of a plurality of processors 56-58, using a communication bus 60. Each processor 56-58 includes an associated high speed, multi-channel, buffered serial port (McBsp port) 62. In the illustrated embodiment, processors 56-58 are digital signal processors (DSPs) configured to transmit and/or receive data to and from terminal units 32, 34 and/or 40.

In a particular embodiment, communication system 36 includes a digital subscriber line xDSL, for example an asymmetric digital subscriber line (ADSL) premises gateway, which provides a broadband connection and intelligently routes voice, data, virtual private network (VPN) and multimedia streams throughout an internal network. Communication system 36 allows a user to customize preferences and connect multiple devices, allowing seamless sharing of information, including derived voice services. Communication coupling 42 provides connectivity between communication system 36 and communications network 52.

Terminal unit 34 is desktop personal computer (PC), laptop, PDA, or other device coupled with processor 56 of communication system 36, through communication link 64. Terminal unit 34 is Internet-enabled and includes a web browser for accessing the World Wide Web (WWW) through communication network 52. Terminal unit 46 is also a PC, or other computing device which provides Local Area Network (LAN) connectivity and functionality to users of terminal unit 46. Terminal units 34 and 46 also include the ability to communicate with terminal units 32 and 40, coupled with communication system 36. In a particular embodiment, terminal units 34 and 46 provide LAN capability to users of network 80.

Terminal units 32 are telephone extensions coupled with processor 57 of communication system 36 through communication links 65. In particular embodiments, terminal units 32 may include various analog, digital, or other wireline voice communication device. Terminal units 32 accommodate wireline telephone communications with each other, network 52, and other terminal units 34 and 40 coupled with communication system 36. Terminal units 32 are also configured to receive control information from communication system 36, and operate subject to the intelligence of communication system 36.

Terminal units 40 are wireless handsets coupled with transmitter 38 using wireless communication link 66. Transmitter 38 is coupled with processor 58 of communication system 36. Data may be sent and received by and among each of terminal units 40, communication system 36, network 52, and other terminal units 32 and 34 coupled with communication system 36. Although transmitter 38 is separate from and coupled with communication system 36 in the illustrated embodiment, in other embodiments transmitter 38 may be integral to communication system 36.

Communication system 36 accommodates the transfer of data between network 52 and terminal units 32, 34 and 40. In the illustrated embodiment, communication links 67-69 which couple communication coupling 42 with modular jack 44, modular jack 44 with NID 48, and NID 48 with communication network 52, respectively, accommodate asymmetric digital subscriber lines (ADSLs).

ADSL is a high-speed data transmission technology that uses unshielded twisted pair (UTP) copper wires from the central office of a telephone company to the subscribers premises. Accordingly, ADSL technology may be used to transmit multimedia and high-speed data over existing telephone lines, concurrently with telephone signals. Accordingly, a communication signal may be received from an ISP, ASP, or telecommunications company (telco), in which analog telephone signals occupy a low frequency band, and ADSL signals occupy a higher frequency band within the ADSL signal. In particular embodiments, analog telephone signals may include plain old telephone service (POTS) and other signals, and ADSL signals may include digital, high-speed data signals.

In general, throughout this specification, the term analog voice signals refers to signals communicated over a frequency band, or range of approximately twenty hertz to approximately four kilohertz (20 Hz to 4 KHz). High-speed data signals, for example xDSL signals, refer to signals communicated over a frequency band of approximately twenty-five kilohertz to approximately one and one-tenth megahertz (25 KHz to 1.1 MHz). Home PNA signals of the present invention are communicated over a frequency band of approximately five and one-half megahertz to approximately nine and one-half megahertz (5.5 MHz to 9.5 MHz).

In other embodiments, communication links 67-69 may include any high-speed communication links including, without limitation, copper, cable, optical or wireless links. Links 67-69 transfer data between communication system 36 and network 52. In general, the rate at which data is received at communication system 36 is greater than the rate at which data is sent from communication system 36, which accounts for the term "asymmetric" digital subscriber line. Similarly, communication links 67-69 and communication system 36 may be configured to provide other digital subscriber line (DSL) services, including technologies referred to as HDSL, IDSL, RADSL, SDSL, VDSL and other xDSL services.

Communication network 52 incorporates both asynchronous and synchronous transmission equipment and technologies. In this manner, network 52 may communicate with a number of different networks and products using various data transfer rates, standards and protocols of the telecommunications and network communications industries. Therefore, communication network 52 receives, processes, and/or transmits analog and/or digital signals. Accordingly, communication links 67-69 and communication system 36 are configured to receive data at different rates of transfer. Data packets received at communication system 36 through communication links 67-69 are asynchronous data packets, and the rate at which the packets are received and transferred to central processor 54 varies according to the specifications of the system sending the data.

Communication bus 60 distributes data and information between central processor 54 and/or processors 56-58. In the illustrated embodiment, communication bus 60 is a bi-directional, multi-rate communication bus. In other words, communication bus 60 is configured to perform two-way communication between components of communication system 36. Central processor 54 transfers data to processor 56, for example, and processor 56 transfers data to central processor 54. In a particular embodiment, communication bus 60 may handle two-way communication simultaneously.

Communication bus 60 is time-division multiplexed. Therefore, bus 60 accommodates synchronous data transfer between central processor 54 and processors 56-58. Asynchronous data packets received at central processor 54 are converted to synchronous data packets for transfer over communication bus 60. However, terminal units 32, 34 and/or 40 are configured to receive standard asynchronous data transfer. Hence, the synchronous data packets transmitted using communication bus 60 are converted back to asynchronous data packets at one or more of processors 56-58, for transfer to one or more of terminal units 46-48.

As previously described, network 52 sends and receives data using communication link 69. Communication signals transmitted from network 52 are received at NID 48. NID 48 is a device wired between a telephone protector and wiring internal to an internal network 80 (e.g., residence, and business). NID 48 functions to isolate and protect wiring internal to network 80.

NID 48 transmits data to, and receives data from modular jack 44, using communication link 68. Modular jack 44 is the initial point of entry of communication signals received by network 80. Modular jack 44 is a receptacle used in conjunction with a plug to make electrical contact between communication circuits associated with network 52 and internal network 80. In other embodiments, jack 44 may be used in a variety of connecting hardware applications including cross connects, interconnects, information outlets, and equipment connections. A variety of different types of modular jacks are available for use within the teachings of the present invention. Such modular jacks include, without limitation, RJ-11, RJ-14, RJ-45 and RJ-48 couplings.

In a particular embodiment, modular jack 44 functions similarly to a standard telephone jack in a residence or business. Accordingly, terminal units 50 are coupled with modular jack 44 using communications links 70. Terminal units 50 provides access to the public switched telephone network (PSTN) of communication network 52, and are configured to receive low frequency analog telephone signals. Terminal units 50 may also be configured to provide enhanced telecommunications features such as call waiting, caller ID, call forwarding, three-way calling and other telecommunication upgrades of service.

Modular jack 44 transmits ADSL signals received from network 52 to communication coupling 42 using communication link 67. Communication coupling 42 separates high-speed data signals (higher frequency) from analog telephone signals (lower frequency), and sends each to the appropriate devices. Communication coupling 42 transmits the analog telephone signals and high-speed data signals to communication system 36, using communication links 71-73. Therefore, communication links 71-73, as well as communication link 74 allow for the transfer of low and high frequency communication signals between and among communication coupling 42 and communication system 36. Such signals may include analog telephone signals, ADSL signals and Home PNA signals. In the illustrated embodiment, communication coupling 42 provides six communication ports 82-87 operable to couple communication coupling 42 with various network devices and components. In alternative embodiments, communication ports 82-87 may include any coupling with a communication link, including modular jacks, modular plugs, and/or direct, hard-wired connections.

Although FIG. 1 illustrates terminal units 32, 34, 40, 46 and 50 described above, network 30 contemplates any arrangement or number of computing and/or communication devices coupled with communication system 36. Such devices include digital, analog, cable and/or optical technologies employing wireless and/or wireline techniques. Furthermore, each terminal unit 32, 34, 40, 46 and 50 described above may be used interchangeably between and among modular jack 44, communication ports 82-84 and/or coupled with one of processors 56-58.

Figure 2A:
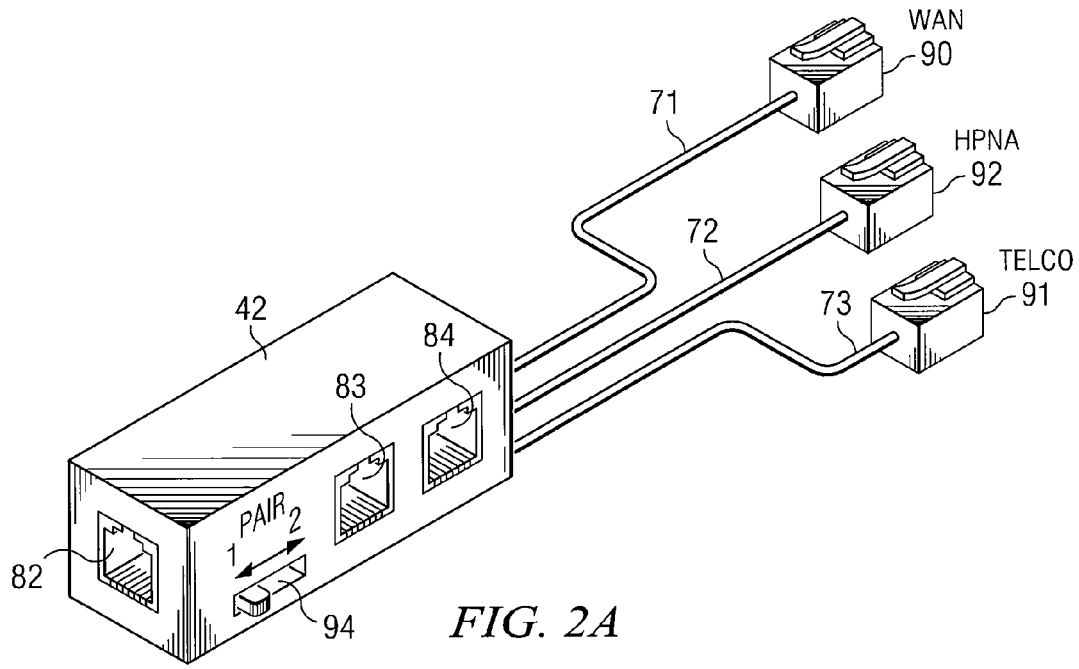
FIG. 2A is an isometric view illustrating the communication coupling of FIG. 1, in accordance with a particular embodiment of the present invention.
Figure 2B:
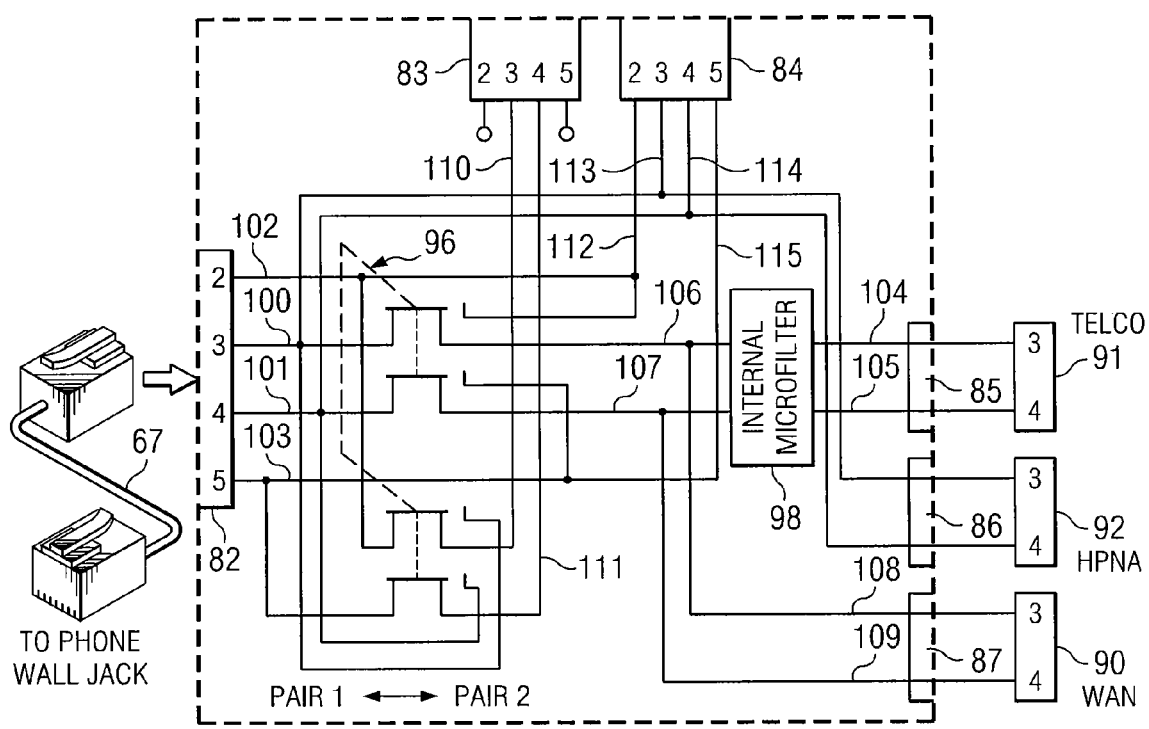
FIG. 2B is a schematic wiring diagram, illustrating components of the communication coupling of FIG. 1.

FIGS. 2A and 2B illustrate communication coupling 42 and its internal wiring and components, including communication ports 82-87. Communication port 82 couples communication coupling 42 with modular jack 44 using communication link 67. Accordingly, communication port 82 is operable to receive communication signals from communication network 52. Communication port 84 couples communication coupling 42 with communication link 75 and therefore, terminal unit 46.

Communication ports 85-87 couple communication coupling 42 with communication system 36, using communication links 71-73. Communication links 71-73 of communication coupling 42 include modular plugs 90-92, which are used to couple communication coupling 42 with communication system 36. In a particular embodiment, communication links 71-73 may be wired directly to communication system 36 in lieu of using modular plugs 90-92. Communication link 71 of the illustrated embodiment is operable to provide a wide area network (WAN) coupling between communication coupling 42 and communication system 36. Accordingly, communication port 87 communicates analog telephone signals and high-speed data signals between and among communication coupling 42 and communication system 36.

Communication link 72 provides a Home PNA communication link between communication system 36 and communication coupling 42. In the illustrated embodiment, the Home PNA communication link is a LAN coupling between communication coupling 42 and communication system 36. In a particular embodiment, Home PNA LAN components communicate using a frequency band higher than typical ADSL signals.

Accordingly, communication system 36 generates Home PNA signals for distribution to various components of internal network 80. This allows one or more personal computers or other terminal unit(s) described above to be coupled with communication system 36 and/or communication coupling 42 to provide LAN configuration and functionality. Therefore, communication port 86 communicates high-speed data for LAN communication between communication coupling 42 and communication system 36. Personal computers or other types of communication and/or computing devices described above may be plugged into communication port 84 or jack 44 to receive LAN network traffic.

Communication link 73 is operable to provide a telecommunications coupling between communication coupling 42 and communication system 36. Communication port 85 transmits and receives analog telephone signals between and among communication coupling 42 and communication system 36. In another embodiment, which will be described in more detail with respect to FIGS. 3A and 3B, communication links 71-73 may be combined to provide a single communication link which offers a LAN coupling, Home PNA coupling and WAN coupling.

Communication link 74 provides a coupling between communication coupling 42 and communication system 36 to accommodate both analog telephone signals and high-speed data signal transfer between communication coupling 42 and communication system 36. In a particular embodiment, communication link 74 allows communication system 36 to at least partially control and communicate analog telephone signals and/or high speed data signals to terminal units throughout internal network 80, which are not directly connected with communication system 36, including terminal units 46 and 50. Accordingly, a user may take advantage of existing telephone wiring within internal network 80 and need not directly connect each terminal unit to communication system 36 to maintain central control and distribution of communication signals from communication system 36.

In the illustrated embodiment, modular jacks 44 and communication ports 82-87 are used to couple communication coupling 42 with various network elements and components. However, in alternative embodiments, such couplings may be accomplished using modular jacks, plugs, and/or direct wiring of communication links 67 and/or 71-75, in lieu of the illustrated modular jack 44 and communication ports 82-87.

Communication ports 82-84 of the illustrated embodiment are two-pair (four conductor) communication ports. Modular plugs 90-92 are one-pair (two conductors) modular plugs. As described above, in alternative embodiments, various configurations of communication ports and modular plugs having multiple conductor configurations, including six or more conductors, are available for use within the teachings of the present invention.

Communication port 82 of communication coupling 42 receives communication signals including high-speed data and analog telephone signals, from modular jack 44. Communication port 82 includes an "inner pair" of conductors 100, 101 and an "outer pair" of conductors 102, 103. The distribution of signals between conductors 100-103 and other components of communication coupling 42 are controlled, in part, by a four pole, double throw (two-position) switch 96, which is actuated by a switch selector 94. Selector 94 allows a user to select setting "pair 1" or "pair 2". The implications of this selection are evident with regard to the internal wiring diagram of FIG. 2B, and will be described below, in more detail.

When selector 94 is in the "pair 1" position, conductors 100 and 101 are coupled with an internal microfilter 98 using conductors 106 and 107. Conductors 104 and 105 couple microfilter 98 with modular plug 91. In a particular embodiment, microfilter 98 filters signals based upon their frequency, and only allows a range of lower frequency band signals (e.g., analog telephone signals) to be transmitted to modular plug 91. Accordingly, analog telephone signals and high-speed data signals received by conductors 100, 101 are received at internal microfilter 98, and microfilter 98 prevents the high-speed data signals from being transmitted to modular plug 91.

Moreover, microfilter 98 prevents analog telephone "noise" generated by analog telephone signals through communication system 36 from affecting the operation of the WAN. Therefore, analog telephone signals received by modular plug 91 from communication system 36 are prevented from passing through internal microfilter 98. Microfilter 98 of the illustrated embodiment is internal to communication coupling 42. However, in alternative embodiments, microfilter 98 may comprise an external component coupled with communication coupling 42, between modular plug 91 and communication coupling 42.

A pair of conductors 108 and 109 couple modular plug 90 with conductors 106 and 107. Therefore, when selector 94 is in the "pair 1" position, high-speed data signals and analog telephone signals received by conductors 100 and 101 are communicated to conductors 106 and 107, respectively, and received by modular plug 90, using conductors 108 and 109. However, such signals do not pass through internal microfilter 98, and therefore both high-speed data signals and analog telephone signals are received by modular plug 90, and transmitted to communication system 36.

Modular plug 83 is coupled with a pair of conductors 110 and 111. When selector 94 is in the "pair 1" position, conductors 110 and 111 are coupled with conductors 102 and 103, respectively. Accordingly, modular plug 83 may be coupled with communication system 36 in order to communicate signals between communication system 36 and modular plug 82.

Modular plug 84 includes four conductors 112-115. Conductors 112 and 115 form an "outer pair" of conductors, which are coupled with conductors 102 and 103, respectively. Conductors 113 and 114 form an "inner pair" of conductors, which are coupled with conductors 100 and 101, respectively. Therefore, terminal units coupled with modular plug 84 may be configured to communicate with modular plug 82 using "outer pair" conductors 112 and 115, and/or "inner pair" 113 and 114.

When selector 94 is moved to the "pair 2" position, switch 96 is actuated which reconfigures the paths of communication within communication coupling 42. In the "pair 2" position, conductors 100 and 101 are coupled with conductors 110 and 111, respectively. Therefore, signals received by modular plug 83 from communication system 36 are communicated between modular plug 83 and modular plug 82 using the "inner pair" of conductors 100 and 101.

Furthermore, when selector 94 is in the "pair 2" position, conductors 102 and 103 are coupled with conductors 106 and 107. In this manner, communication signals communicated between conductors 102 and 103 and modular plug 91 pass through internal microfilter 98. Conversely, communication signals communicated between conductors 102, 103 and modular plug 90 do not pass through microfilter 98.

In a particular embodiment, ADSL signals and analog telephone signals are received by communication port 82 using communication link 67. Such signals pass through microfilter 98, which filters out high frequency signals and allows only the low frequency analog telephone signals to pass through to modular plug 91. Modular plug 91 then communicates the low frequency analog telephone signals to communication system 36. Modular plug 90 receives the ADSL signals and analog telephone signals and transmits both, unfiltered, to communication system 36. Communication system 36 processes both signals and transmits signals to terminal units 32, 34 and 40, as appropriate. In a particular embodiment, communication system 36 "back-feeds" or transmits particular low and/or high frequency signals to communication coupling 42.

Modular plug 83 allows communication system 36 to transmit certain low frequency analog telephone signals to communication coupling 42, for transmission to modular jack 44 and terminal units 50. Furthermore, selector 94 and switch 96 ensure that the communication signals received by communication port 82 and the analog telephone signals transmitted from communication port 82 to modular jack 44 will not share the same conductors 100-103, simultaneously.

Many telcos transmit ADSL signals and analog telephone signals to an internal network using the "inner pair" of a four-conductor communication link. Switch 96 ensures that in order to receive such signals at "inner pair" conductors 100 and 101, "outer pair" conductors 102 and 103 are used to transmit analog telephone signals from communication port 82 to modular jack 44. However, standard telecommunications equipment is configured to receive communication signals using the "inner pair" of a four-conductor communication link. Accordingly, if ADSL signals and analog telephone signals are received by communication coupling 42 using the "inner pair" of conductors 100, 101, terminal units 50 will receive all incoming calls on their respective "inner pair" of conductors, as communication coupling 42 receives them.

However, terminal units 50 may be configured to receive signals on their respective "outer pair" of conductors by adding an adapter to each phone. This will prevent terminal units 50 from ringing unless communication system 36 sends a "ring" signal to one of terminal units 50. Therefore, in order to transmit low frequency signals to terminal units 50 using "outer pair" conductors 102 and 103, terminal units 50 may require special adapters and/or filters which transfer the signals to the "outer pair" of conductors of a four-conductor communication link.

Communication coupling 42 provides a method and apparatus to transmit low frequency signals to terminal units 50 without having to specially configure each terminal unit 50 to receive such signals using the "outer pair" of conductors. Furthermore, ADSL signals may be received at communication port 82 such that the ADSL signals received by communication port 82 and low frequency analog telephone signals transmitted by communication port 82 do not share the same communication path over conductors 100-103.

In a particular embodiment, network interface device 44, modular jack 44 and/or another component of communication network 52 may be configured such that communication signals received from network 52 are received at communication port 82 using "outer pair" conductors 102 and 103. Switch 96 may then be placed in the "pair 2" position such that such signals are transmitted to communication system 36. In this manner, analog telephone signals transmitted from communication system 36 to modular plug 83 for distribution to one or more of terminal units 50 are transmitted using "inner pair" conductors 100 and 101. Therefore, the analog telephone signals may be received by terminal units 50 using an "inner pair" of conductors associated with communication links 67 and 70. Furthermore, terminal units 50 may include "off the shelf" communications equipment and no adapters, or modifications are required.

The use of communication system 36 to distribute low frequency signals to terminal units 50 allows terminal units 50 to operate subject to the control of communication system 36. Accordingly, services and functionality provided by communication system 36 are available to terminal units 50. For example, communication system 36 can distribute telephone calls to one or more of terminal units 50 based upon the call origination. Communication system 36 may be configured to determine which particular terminal unit 50 should ring depending upon the caller ID. Furthermore, communication system 36 may be configured to provide different rings or signals to terminal units 50 based upon pre-configured options selected by a programmer of communication system 36. Communication system 36 may also be configured to provide intercom features and/or LAN capability to terminal units 50.

Communication port 84 may be referred to as a "utility" connector because it allows a user to access either the "inner pair" of conductors 113, 114, or the "outer pair" of conductors 112, 115, from any device the user couples with communication port 84. Therefore, any terminal unit coupled with communication port 84 may be configured to communicate analog telephone signals and/or high-speed data signals with communication coupling 42.

Figure 3A:
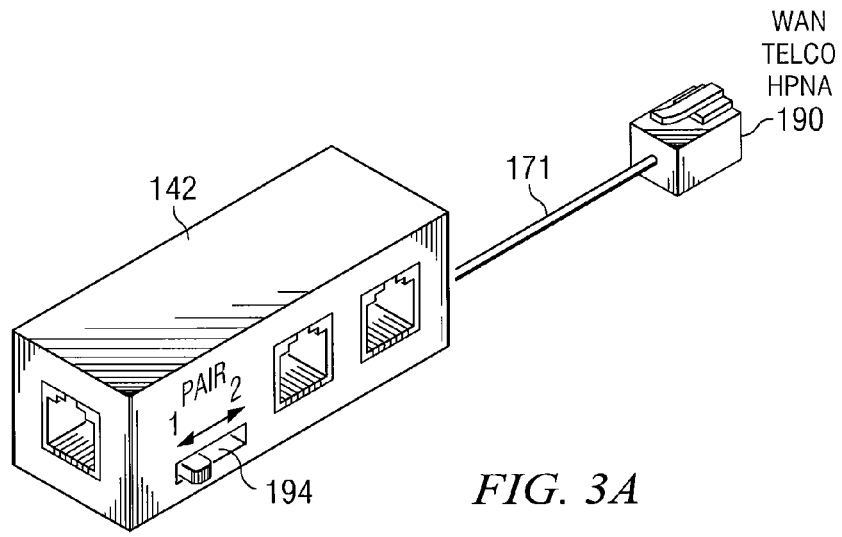
FIG. 3A is an isometric view illustrating an alternative embodiment communication coupling.
Figure 3B:
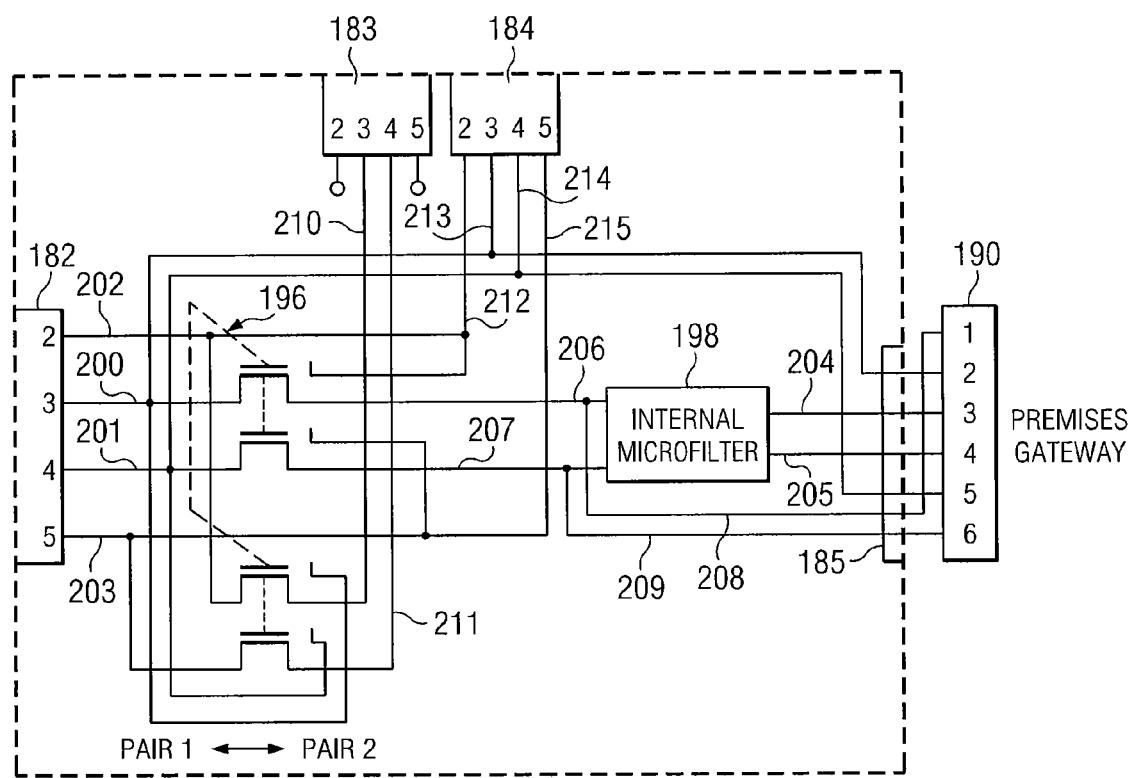
FIG. 3B is a schematic wiring diagram, illustrating components of the communication coupling of FIG. 3A.

FIGS. 3A and 3B illustrate an alternative embodiment communication coupling 142 and its internal wiring. Communication coupling 142 includes communication ports 182-185. Communication port 182 may be used to couple communication coupling 142 with modular jack 44 using communication link 67. Accordingly, communication port 182 is operable to receive analog telephone signals and signals from communication network 52. Communication port 184 may be used to couple communication coupling 142 with one or more terminal units 46.

Communication port 185 may be used to couple communication coupling 142 with communication system 36, using communication links 171. Communication link 171 of communication coupling 142 includes a modular plug 190, which is used to couple communication coupling 142 with communication system 36. In a particular embodiment, communication link 171 may be wired directly to communication system 36 in lieu of using modular plug 190.

In a particular embodiment, communication link includes six conductors, which terminate at modular plug 190. In this embodiment, modular plug 190 may be an RJ-45 modular plug.

Communication link 171 is operable to provide a wide area network (WAN) coupling, a telecommunications coupling, and a Home PNA coupling between communication coupling 142 and communication system 36. Such couplings provide services and functionality as described above with regard to communication links 71-73.

Communication port 182 of communication coupling 142 receives communication signals including high-speed data and analog telephone signals, from modular jack 44. Communication port 182 includes an "inner pair" of conductors 200, 201 and an "outer pair" of conductors 202, 203. The distribution of signals between conductors 200-203 and other components of communication coupling 142 are controlled, in part, by a four pole, double throw (two-position) switch 196, which is actuated by a switch selector 194. Selector 194 allows a user to select setting "pair 1" or "pair 2". The implications of this selection are evident with regard to the internal wiring diagram of FIG. 3B, and will be described below, in more detail.

When selector 194 is in the "pair 1" position, conductors 200 and 201 are coupled with an internal microfilter 198 using conductors 206 and 207. Conductors 204 and 205 couple microfilter 198 with modular plug 190. Microfilter 198 filters signals based upon their frequency, and only allows lower frequency band signals (e.g., analog telephone signals) to be transmitted to modular plug 190. Accordingly, analog telephone signals and high-speed data signals received by conductors 200, 201 are received at internal microfilter 198, and microfilter 198 prevents the high-speed data signals from being transmitted to conductors 204 and 205.

A pair of conductors 208 and 209 couple modular plug 190 with conductors 206 and 207. Therefore, when selector 194 is in the "pair 1" position, high-speed data and analog telephone signals received by conductors 200 and 201 are communicated to conductors 206 and 207, respectively, and received by modular plug 190, using conductors 208 and 209. However, such signals do not pass through internal microfilter 198, and therefore both high-speed data and analog telephone signals are received by modular plug 190, and transmitted to communication system 36.

Modular plug 183 is coupled with a pair of conductors 210 and 211. When selector 194 is in the "pair 1" position, conductors 210 and 211 are coupled with conductors 202 and 203, respectively. Accordingly, modular plug 183 may be coupled with communication system 36 in order to communicate signals between communication system 36 and modular plug 182.

Modular plug 184 includes four conductors 212-215. Conductors 212 and 215 form an "outer pair" of conductors, which are coupled with conductors 202 and 203, respectively. Conductors 213 and 214 form an "inner pair" of conductors, which are coupled with conductors 200 and 201, respectively.

Therefore, terminal units coupled with modular plug 184 may be configured to communicate with modular plug 182 using "outer pair" conductors 212 and 215, and/or "inner pair" 213 and 214.

When selector 194 is moved to the "pair 2" position, switch 196 is actuated which reconfigures the paths of communication within communication coupling 142. In the "pair 2" position, conductors 200 and 201 are coupled with conductors 210 and 211, respectively. Therefore, signals received by modular plug 183 from communication system 36 are communicated between modular plug 183 and modular plug 182 using the "inner pair" of conductors 200 and 201.

Furthermore, when selector 194 is in the "pair 2" position, conductors 202 and 203 are coupled with conductors 206 and 207. In this manner, communication signals communicated between conductors 202 and 203 and conductors 204 and 205 pass through internal microfilter 198. Conversely, communication signals communicated between conductors 202, 203 and conductors 208 and 209 do not pass through microfilter 198.

ADSL signals and analog telephone signals are received by communication port 182 using communication link 67. Such signals pass through microfilter 198, which filters out high frequency signals and allows only the low frequency analog telephone signals to pass through to conductors 204 and 205. Modular plug 190 then communicates the analog telephone signals to communication system 36. Conductors 208 and 209 receive the ADSL signals and analog telephone signals and transmit both, unfiltered, to communication system 36.

Modular plug 183 allows communication system 36 to transmit certain low frequency signals to communication coupling 142, for transmission to modular jack 44 and terminal units 50. Furthermore, selector 194 and switch 196 ensure that the signals received from communication network and the low frequency signals transmitted from communication port 182 to modular jack 44 will not occupy the same conductors 200-203, simultaneously.

Accordingly, communication coupling 142 provides similar advantages to communication coupling 42 described above. However, connectivity between communication coupling 142 and communication system 36 may be accomplished over a single, six-conductor communication link 171, as opposed to using three independent communication links.

Selectors 94 and 194 described above provide a user-friendly method for a user to reconfigure the wiring of their internal network 80. By isolating the "inner pair" from the "outer pair" of conductors, common mistakes are avoided in configuring ADSL systems, and the user is prevented from distributing low frequency POTS signals to terminal units over the same path of communication by which the communication coupling is receiving the ADSL signal. Furthermore, communication couplings 42 and 142 may be used to replace multiple cords, adapters and connectors typically used to configure such systems and networks. Communication couplings 42 and 142 also allow a user to configure their own network 80 without necessitating a visit from a skilled technician, commonly referred to as "truck roll."

Figure 4A:
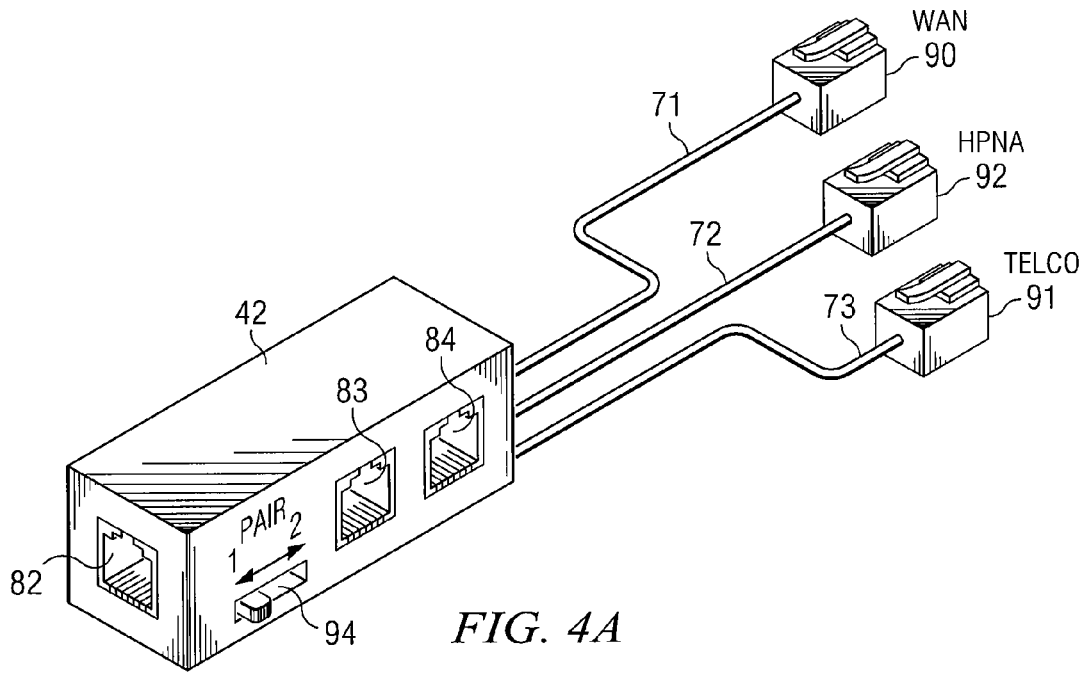
FIG. 4A is an isometric view illustrating the communication coupling of FIG. 1, in accordance with a particular embodiment of the present invention.
Figure 4B:
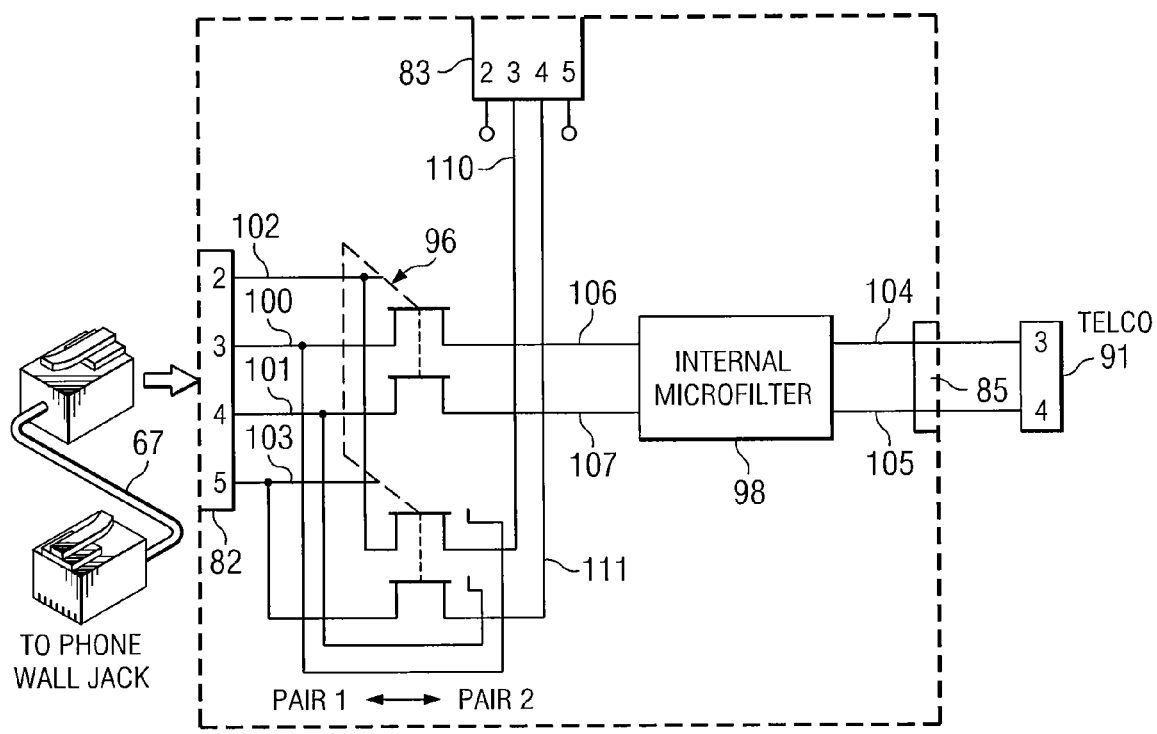
FIG. 4B is a schematic wiring diagram, illustrating components of the communication coupling of FIG. 1.

FIGS. 4A and 4B illustrate communication coupling 42 and its internal wiring and components, including communication ports 82, 83, and 85. Communication port 82 couples communication coupling 42 with modular jack 44 using communication link 67. Accordingly, communication port 82 is operable to receive communication signals from communication network 52.

Communication port 85 couples communication coupling 42 with communication system 36, using communication link 73. Communication link 73 of communication coupling 42 includes modular plug 91, which is used to couple communication coupling 42 with communication system 36. In a particular embodiment, communication link 73 may be wired directly to communication system 36 in lieu of using modular plug 91.

Communication link 73 is operable to provide a telecommunications coupling between communication coupling 42 and communication system 36. Communication port 85 transmits and receives analog telephone signals between and among communication coupling 42 and communication system 36.

Communication link 74 provides a coupling between communication coupling 42 and communication system 36 to accommodate both analog telephone signals and high-speed data signal transfer between communication coupling 42 and communication system 36. In a particular embodiment, communication link 74 allows communication system 36 to at least partially control and communicate analog telephone signals and/or high speed data signals to terminal units throughout internal network 80, which are not directly connected with communication system 36, including terminal units 46 and 50. Accordingly, a user may take advantage of existing telephone wiring within internal network 80 and need not directly connect each terminal unit to communication system 36 to maintain central control and distribution of communication signals from communication system 36.

In the illustrated embodiment, modular jacks 44 and communication ports 82, 83, and 85 are used to couple communication coupling 42 with various network elements and components. However, in alternative embodiments, such couplings may be accomplished using modular jacks, plugs, and/or direct wiring of communication links 67 and/or 73-74, in lieu of the illustrated modular jack 44 and communication ports 82, 83, and 85.

Communication ports 82-83 of the illustrated embodiment are two-pair (four conductor) communication ports. Modular plug 91 is a one-pair (two conductors) modular plug. As described above, in alternative embodiments, various configurations of communication ports and modular plugs having multiple conductor configurations, including six or more conductors, are available for use within the teachings of the present invention.

Communication port 82 of communication coupling 42 receives communication signals including high-speed data and analog telephone signals, from modular jack 44. Communication port 82 includes an "inner pair" of conductors 100, 101 and an "outer pair" of conductors 102, 103. The distribution of signals between conductors 100-103 and other components of communication coupling 42 are controlled, in part, by a four pole, double throw (two-position) switch 96, which is actuated by a switch selector 94. Selector 94 allows a user to select setting "pair 1" or "pair 2". The implications of this selection are evident with regard to the internal wiring diagram of FIG. 4B, and will be described below, in more detail.

When selector 94 is in the "pair 1" position, conductors 100 and 101 are coupled with an internal microfilter 98 using conductors 106 and 107. Conductors 104 and 105 couple microfilter 98 with modular plug 91. In a particular embodiment, microfilter 98 filters signals based upon their frequency, and only allows a range of lower frequency band signals (e.g., analog telephone signals) to be transmitted to modular plug 91. Accordingly, analog telephone signals and high-speed data signals received by conductors 100, 101 are received at internal microfilter 98, and microfilter 98 prevents the high-speed data signals from being transmitted to modular plug 91.

Moreover, microfilter 98 prevents analog telephone "noise" generated by analog telephone signals through communication system 36 from affecting the operation of the WAN. Therefore, analog telephone signals received by modular plug 91 from communication system 36 are prevented from passing through internal microfilter 98. Microfilter 98 of the illustrated embodiment is internal to communication coupling 42. However, in alternative embodiments, microfilter 98 may comprise an external component coupled with communication coupling 42, between modular plug 91 and communication coupling 42.

Modular plug 83 is coupled with a pair of conductors 110 and 111. When selector 94 is in the "pair 1" position, conductors 110 and 111 are coupled with conductors 102 and 103, respectively. Accordingly, modular plug 83 may be coupled with communication system 36 in order to communicate signals between communication system 36 and modular plug 82.

When selector 94 is moved to the "pair 2" position, switch 96 is actuated which reconfigures the paths of communication within communication coupling 42. In the "pair 2" position, conductors 100 and 101 are coupled with conductors 110 and 111, respectively. Therefore, signals received by modular plug 83 from communication system 36 are communicated between modular plug 83 and modular plug 82 using the "inner pair" of conductors 100 and 101.

Furthermore, when selector 94 is in the "pair 2" position, conductors 102 and 103 are coupled with conductors 106 and 107. In this manner, communication signals communicated between conductors 102 and 103 and modular plug 91 pass through internal microfilter 98. Conversely, communication signals communicated between conductors 102, 103 and modular plug 90 do not pass through microfilter 98.

In a particular embodiment, ADSL signals and analog telephone signals are received by communication port 82 using communication link 67. Such signals pass through microfilter 98, which filters out high frequency signals and allows only the low frequency analog telephone signals to pass through to modular plug 91. Modular plug 91 then communicates the low frequency analog telephone signals to communication system 36.

Modular plug 83 allows communication system 36 to transmit certain low frequency analog telephone signals to communication coupling 42, for transmission to modular jack 44 and terminal units 50. Furthermore, selector 94 and switch 96 ensure that the communication signals received by communication port 82 and the analog telephone signals transmitted from communication port 82 to modular jack 44 will not share the same conductors 100-103, simultaneously.

Many telcos transmit ADSL signals and analog telephone signals to an internal network using the "inner pair" of a four-conductor communication link. Switch 96 ensures that in order to receive such signals at "inner pair" conductors 100 and 101, "outer pair" conductors 102 and 103 are used to transmit analog telephone signals from communication port 82 to modular jack 44. However, standard telecommunications equipment is configured to receive communication signals using the "inner pair" of a four-conductor communication link. Accordingly, if ADSL signals and analog telephone signals are received by communication coupling 42 using the "inner pair" of conductors 100, 101, terminal units 50 will receive all incoming calls on their respective "inner pair" of conductors, as communication coupling 42 receives them.

However, terminal units 50 may be configured to receive signals on their respective "outer pair" of conductors by adding an adapter to each phone. This will prevent terminal units 50 from ringing unless communication system 36 sends a "ring" signal to one of terminal units 50. Therefore, in order to transmit low frequency signals to terminal units 50 using "outer pair" conductors 102 and 103, terminal units 50 may require special adapters and/or filters which transfer the signals to the "outer pair" of conductors of a four-conductor communication link.

Communication coupling 42 provides a method and apparatus to transmit low frequency signals to terminal units 50 without having to specially configure each terminal unit 50 to receive such signals using the "outer pair" of conductors. Furthermore, ADSL signals may be received at communication port 82 such that the ADSL signals received by communication port 82 and low frequency analog telephone signals transmitted by communication port 82 do not share the same communication path over conductors 100-103.

In a particular embodiment, network interface device 44, modular jack 44 and/or another component of communication network 52 may be configured such that communication signals received from network 52 are received at communication port 82 using "outer pair" conductors 102 and 103. Switch 96 may then be placed in the "pair 2" position such that such signals are transmitted to communication system 36. In this manner, analog telephone signals transmitted from communication system 36 to modular plug 83 for distribution to one or more of terminal units 50 are transmitted using "inner pair" conductors 100 and 101. Therefore, the analog telephone signals may be received by terminal units 50 using an "inner pair" of conductors associated with communication links 67 and 70. Furthermore, terminal units 50 may include "off the shelf" communications equipment and no adapters, or modifications are required.

The use of communication system 36 to distribute low frequency signals to terminal units 50 allows terminal units 50 to operate subject to the control of communication system 36. Accordingly, services and functionality provided by communication system 36 are available to terminal units 50. For example, communication system 36 can distribute telephone calls to one or more of terminal units 50 based upon the call origination. Communication system 36 may be configured to determine which particular terminal unit 50 should ring depending upon the caller ID. Furthermore, communication system 36 may be configured to provide different rings or signals to terminal units 50 based upon pre-configured options selected by a programmer of communication system 36. Communication system 36 may also be configured to provide intercom features and/or LAN capability to terminal units 50.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A communication coupling, comprising:
   a first communication port operable to communicate with a network component, the first communication port having first and second paths of communication; and
   a switch coupled with the first communication port, the switch having a first position in which the first communication port is operable to receive a first communication signal from the network component using the first path of communication and is operable to transmit a second communication signal to the network component using the second path of communication, and a second position in which the first communication port is operable to receive the first communication signal from the network component using the second communication path and is operable to transmit the second communication signal to the network component using the first communication path.

2. The communication coupling of claim 1, wherein the first communication signal includes a first frequency band and a second frequency band, and further comprising a filter coupled with the first communication port and operable to separate the first frequency band from the second frequency band.

3. The communication coupling of claim 2, further comprising third and fourth communication paths coupling the communication coupling with a communication system, the third communication path transmitting the first frequency band to the communication system and the second communication path transmitting the first and second frequency bands to the communication system.

4. The communication coupling of claim 3, wherein the third communication path includes a first pair of conductors, and the fourth communication path includes a second pair of conductors.

5. The communication coupling of claim 1, wherein the first communication port comprises an RJ-11 coupling and the first path of communication comprises an inner pair of conductors.

6. The communication coupling of claim 1, wherein the first communication signal includes a digital subscriber line (DSL) signal and a first analog telephone signal, and the second communication signal includes a second analog telephone signal.

7. The communication coupling of claim 1, further comprising a second communication port operable to communicate with a communication system, the second communication port further operable to transmit the second communication signal to the first communication port.

8. The communication coupling of claim 7, further comprising a third communication port operable to transmit the first communication signal to the communication system.

9. The communication coupling of claim 8, wherein the third communication port includes an RJ-45 coupling.

10. A communication coupling, comprising:
a first communication port having first and second paths of communication with a network component, and operable to receive a first communication signal from the network component using the first path of communication;
a second communication port operable to transmit the first communication signal to a communication system;
a third communication port operable to receive a second communication signal from the communication system;
the first communication port further operable to transmit the second communication signal to the network component using the second path of communication;
wherein the first communication signal includes a first frequency band and a second frequency band; and
further comprising a filter operable to separate the first frequency band from the second frequency band.

11. The communication coupling of claim 10, wherein the first communication port includes a first pair of conductors and a second pair of conductors, and further comprising a switch having a first position in which the first path of communication includes the first pair of conductors and a second position in which the first path of communication includes the second pair of conductors.

12. The communication coupling of claim 10, further comprising at least third and fourth communication paths coupling the communication coupling with a communication system, the third communication path communicating the first frequency band with the communication system and the fourth communication path communicating the first and second frequency bands with the communication system.

13. The communication coupling of claim 10 wherein the first communication signal includes a digital subscriber line (DSL) signal and a first analog telephone signal, and the second communication signal includes a second analog telephone signal.

14. The communication coupling of claim 10, further comprising a fourth communication port operable to communicate with a terminal unit.

15. A method for distributing first and second communication signals, comprising:
receiving the first communication signal at a communication coupling using a first path of communication between the communication coupling and a network component;
transmitting the first communication signal from the communication coupling to a communication system;
receiving the second communication signal at the communication coupling from the communication system;
transmitting the second communication signal to the network component using a second path of communication between the communication coupling and the network component;
wherein the first communication signal includes a first frequency band and a second frequency band; and
further comprising separating the first frequency band from the second frequency band.

16. The method of claim 15, further comprising coupling a switch with the communication coupling, wherein actuation of the switch redirects the first communication signal from the first path of communication to the second path of communication, and redirects the second communication signal from the second path of communication to the first path of communication.

17. The method of claim 15, further comprising communicating the first frequency band with the communication system using a third communication path, and communicating the first and second frequency bands with the communication system using a fourth communication path.

18. A computer readable medium encoded with logic operable to:
receive a first communication signal at a communication coupling using a first path of communication between the communication coupling and a network component;
transmit the first communication signal from the communication coupling to a communication system;
receive a second communication signal at the communication coupling from the communication system;
transmit the second communication signal to the network component using a second path of communication between the communication coupling and the network component;
wherein the first communication signal includes a first frequency band and a second frequency band; and
wherein the logic is further operable to separate the first frequency band from the second frequency band.

19. The computer readable medium of claim 18, wherein the logic is further operable to communicate the first frequency band with the communication system using a third communication path, and communicate the first and second frequency bands with the communication system using a fourth communication path.

20. A system for distributing communication signals, comprising:
   means for receiving a first communication signal at a communication coupling using a first path of communication between the communication coupling and a network component;
   means for transmitting the first communication signal from the communication coupling to a communication system;
   means for receiving a second communication signal at the communication coupling from the communication system;
   means for transmitting the second communication signal to the network component using a second path of communication between the communication coupling and the network component;
   wherein the first communication signal includes a first frequency band and a second frequency band; and
   further comprising means for separating the first frequency band from the second frequency band.

21. The system of claim 20, further comprising means for communicating the first frequency band with the communication system using a third communication path, and means for communicating the first and second frequency bands with the communication system using a fourth communication path.

* * * * *